(12) United States Patent
Lee et al.

(10) Patent No.: US 11,994,382 B2
(45) Date of Patent: May 28, 2024

(54) SYSTEM AND METHOD FOR AUTOMATICALLY CHECKING SEAT DIMENSION ACCURACY AND COMPUTER-READABLE RECORDING MEDIUM RECORDED WITH PROGRAM FOR THE SAME

(71) Applicants: HYUNDAI MOTOR COMPANY, Seoul (KR); KIA MOTORS CORPORATION, Seoul (KR); Texas A&M University-Corpus Christi, Corpus Christi, TX (US)

(72) Inventors: Baek Hee Lee, Suwon-si (KR); Min Hyuk Kwak, Seoul (KR); Yeong Sik Kim, Seoul (KR); Jang Woon Park, Corpus Christi, TX (US); Byoung Keon Park, Hillside Drive, MI (US)

(73) Assignees: HYUNDAI MOTOR COMPANY, Seoul (KR); KIA MOTORS CORPORATION, Seoul (KR); TEXAS A&M UNIVERSITY-CORPUS CHRISTI, Corpus Christi, TX (US)

( * ) Notice: Subject to any disclaimer, the term of this patent is extended or adjusted under 35 U.S.C. 154(b) by 378 days.

(21) Appl. No.: 16/816,663

(22) Filed: Mar. 12, 2020

(65) Prior Publication Data

US 2020/0300620 A1    Sep. 24, 2020

(30) Foreign Application Priority Data

Mar. 21, 2019   (KR) ........................ 10-2019-0032310

(51) Int. Cl.
G01B 21/20   (2006.01)

(52) U.S. Cl.
CPC .................................. *G01B 21/20* (2013.01)

(58) Field of Classification Search
None
See application file for complete search history.

(56) References Cited

U.S. PATENT DOCUMENTS

| 9,892,451 B2 * | 2/2018 | Iwase ..................... G06F 16/258 |
| 2004/0011150 A1 * | 1/2004 | Reynolds ............. A47C 31/126 |
| | | 296/64 |

(Continued)

FOREIGN PATENT DOCUMENTS

| CN | 107990840 A | * | 5/2018 |
| JP | 2003-186917 A | | 7/2003 |

(Continued)

*Primary Examiner* — Shelby A Turner
*Assistant Examiner* — Brandon J Becker
(74) *Attorney, Agent, or Firm* — Morgan, Lewis & Bockius LLP

(57) ABSTRACT

A system for automatically checking seat dimension accuracy for a vehicle may include a storage unit configured to store therein seat design data at a time of designing an actually produced seat and seat scan data obtained by scanning the actually produced seat, a controller configured to determine whether the actually produced seat has been produced to match predesigned dimensions using the seat design data and the seat scan data stored in the storage unit, and an output unit configured to automatically output a result of determination by the controller in a specific form. The system and a method for checking seat dimension accuracy for a vehicle can automatically check whether an actually produced seat has been accurately produced to match designed seat dimensions through automatic comparison of scan data of the actually produced seat with seat design data, and automatically generate a checking result report.

8 Claims, 10 Drawing Sheets

(56) References Cited

U.S. PATENT DOCUMENTS

| | | | |
|---|---|---|---|
| 2006/0061566 A1* | 3/2006 | Verma | G06T 17/20 345/582 |
| 2013/0215433 A1* | 8/2013 | Crampton | B64C 39/028 701/8 |
| 2016/0055267 A1* | 2/2016 | Tomono | G06F 30/17 703/1 |
| 2016/0300003 A1* | 10/2016 | Knoll | G06F 30/17 |
| 2017/0057299 A1* | 3/2017 | Daval | B60C 15/0203 |
| 2017/0186217 A1 | 6/2017 | Oldachi et al. | |
| 2019/0325603 A1* | 10/2019 | Nogimori | G06V 10/426 |

FOREIGN PATENT DOCUMENTS

| | | |
|---|---|---|
| JP | 2006-202095 A | 8/2006 |
| KR | 10-0411043 B1 | 12/2003 |
| KR | 10-0799072 B1 | 1/2008 |

* cited by examiner

FIG. 6

Seat Dimension Checking report

— Seat scan drawing
— Seat design drawing

| Section | Outside ⇦ Seat cushion ⇨ Inside | | Outside ⇦ Seat back ⇨ Inside | |
|---|---|---|---|---|
| | H.Pt + 250T | 368.54 / 361.01, 36.49 / 32.99, 28.37 / 32.96 | H.Pt + 350T | 366.5 / 244.41, 56.35 / 35.54, 56.23 / 35.19 |
| Comment | | Pass | | Inferior (Main width 22mm, Bolster height 6mm Shortage) |
| | H.Pt + 125T | 348.34 / 339.66, 53.57 / 47.34, 47.33 / 43.74 | H.Pt + 175T | 310.8 / 303.97, 81.43 / 75.27, 81.43 / 74.35 |
| Comment | | Inferior (Inside bolster height 7mm Excess) | | Inferior (Inside bolster height 6mm Shortage) |
| | H.Pt + 0T | 329.02 / 320.87, 35.86 / 29.72, 29.72 / 25.81 | H.Pt + 35T | 311.73 / 299.68, 60.75 / 52.59, 60.79 / 46.32 |
| Comment | | Inferior (Inside bolster height 6mm Excess) | | Inferior (Main width 12mm, Bolster height 9mm Shortage) |

Comment:
· Cushion effective length 23mm Shortage
· Seat back 21mm Projection (Section view: 485.7, 471.51, 356.53, 333.68, 20.72)

SYSTEM AND METHOD FOR AUTOMATICALLY CHECKING SEAT DIMENSION ACCURACY AND COMPUTER-READABLE RECORDING MEDIUM RECORDED WITH PROGRAM FOR THE SAME

CROSS-REFERENCE TO RELATED APPLICATION

The present application claims priority to Korean Patent Application No. 10-2019-0032310 filed on Mar. 21, 2019, the entire contents of which is incorporated herein for all purposes by this reference.

BACKGROUND OF THE INVENTION

Field of the Invention

The present invention relates to a system and a method for automatically checking seat dimension accuracy for a vehicle and a computer-readable recording medium recorded with a program for the same, and more particularly, to a system and a method for automatically checking seat dimension accuracy for a vehicle and a computer-readable recording medium recorded with a program for the same, which can automatically check whether an actually produced seat has been accurately produced to match predesigned seat dimensions.

Description of Related Art

As is well-known, a seat for a vehicle is configured to include a seat cushion for seating, a seat back for leaning the back thereon, and a head rest for supporting a neck and a head, and such a seat has been produced with different sizes and shapes by vehicle types.

A seat producing process is briefly divided into designing a seat, producing the seat to match the designed dimensions and shape in an actual producing process, and checking the quality of the produced seat.

Furthermore, in checking the quality of the seat, seat dimension accuracy checking is performed to check whether the actually produced seat has been produced to match the designed dimensions and shape.

The seat dimension accuracy checking is performed to include obtaining seat design data from seat design data (e.g., CAD data), obtaining seat measurement data through measurement of the dimensions of an actually produced seat, comparing the seat design data with the seat measurement data, and preparing a quality check report in accordance with the result of the comparison.

However, the seat dimension accuracy checking in the related art has problems that there exist errors on the checking types of respective operators who perform the seat dimension accuracy checking, and thus the accuracy deteriorates in checking the seat dimension accuracy and the quality.

Furthermore, since the seat dimension accuracy checking in the related art is manually performed by the operator, it takes for too much time to perform the checking, and thus workability of the seat quality checking is greatly lowered.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for checking seat dimension accuracy for a vehicle and a computer-readable recording medium recorded with a program for the same, which can automatically check whether an actually produced seat has been accurately produced to match designed seat dimensions through automatic comparison of seat design data with scan data of the actually produced seat, and can automatically generate a checking result report.

In one aspect of the present invention for achieving the object, a system for automatically checking seat dimension accuracy for a vehicle may include a storage unit configured to store therein seat design data at a time of designing an actually produced seat and seat scan data obtained by scanning the actually produced seat; a controller configured to determine whether the actually produced seat has been produced to match predesigned dimensions using the seat design data and the seat scan data stored in the storage unit; and an output unit configured to automatically output a result of determination by the controller in a specific form.

In another aspect of the present invention for achieving the object, a method for automatically checking seat dimension accuracy for a vehicle may include storing, in a storage unit, seat design data at a time of designing an actually produced seat and seat scan data obtained by scanning the actually produced seat; determining, by a controller connected to the storage unit, whether the actually produced seat has been produced to match predesigned dimensions using the seat design data and the seat scan data stored in the storage unit; and automatically outputting, by an output unit connected to the controller, the result of determination by the controller in a specific form.

In yet another aspect of the present invention for achieving the object, a recording medium recorded with a program for executing a method for automatically checking seat dimension accuracy for a vehicle, including storing, in a storage unit, seat design data at a time of designing an actually produced seat and seat scan data obtained by scanning the actually produced seat; determining, by a controller connected to the storage unit, whether the actually produced seat has been produced to match predesigned dimensions using the seat design data and the seat scan data stored in the storage unit; and automatically outputting, by an output unit connected to the controller, the result of determination by the controller in a specific form.

Through the above, various aspects of the present invention provide the following effects.

First, it is possible to automatically check whether the actually produced seat has been accurately produced to match the designed seat dimensions through automatic comparison of the seat design data with the scan data of the actually produced seat, and thus it is possible to improve the accuracy of the seat dimension accuracy checking.

Second, since the seat dimension accuracy checking is automatically performed, it is possible to greatly reduce the checking time in comparison with the existing manual checking (e.g., the existing manual checking time of two hours may be reduced to about one minute).

Third, because of the automation and time reduction of the seat dimension accuracy checking, it is possible to improve workability and accuracy in comparison with the existing manual work.

Fourth, since the seat dimension accuracy checking data and the checking result report after the checking are automatically constructed as a database, it is advantageous to search for and utilize the checking data thereafter.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the disclosure are discussed infra.

BRIEF DESCRIPTION OF THE DRAWINGS

FIG. 6 is an image diagram showing an execution screen of an output unit in a system for checking seat dimension accuracy for a vehicle according to an exemplary embodiment of the present invention.

Figure 1:
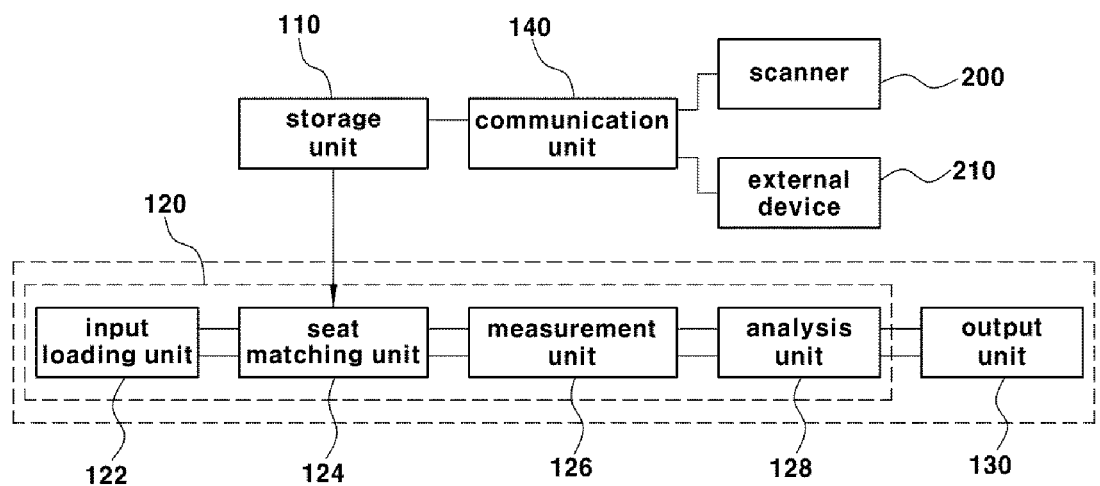
FIG. 1 is a diagram illustrating the configuration of a system for checking seat dimension accuracy for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the whole description, it will be understood that when a component is referred to as being "comprising" any component, it does not exclude other components, but can further comprises the other components unless otherwise specified.

Hereinafter, a preferable embodiment of the present invention will be described with reference to the accompanying drawings.

Referring to FIG. 1, a system for checking seat dimension accuracy for a vehicle according to an exemplary embodiment of the present invention includes a storage unit 110, a controller 120, and an output unit 130, and the controller 120 is configured to include an input loading unit 122, a seat matching unit 124, a measurement unit 126, and an analysis unit 128.

Furthermore, a three-dimensional (3D) scanner 200 and an external device (e.g., smart device) 210 are connected to the storage unit 110 through a communication unit 140, so that data may be transmitted between them.

In the storage unit 110, seat design data (e.g., a CAD file which is a seat design drawing file) at the time of designing and seat scan data (e.g., a seat scan file) obtained by scanning an actually produced seat are stored.

That is, the seat scan data obtained by scanning the actually produced seat using the 3D scanner 200 is inputted to and stored in the storage unit 110 through the communication unit 140, and the seat design data is inputted from the external device 210 to the storage unit 110 through the communication unit 140, and is stored in the storage unit 110.

The controller 120 is configured to determine whether the actually produced seat has been produced to match predesigned dimensions using the seat design data and the seat scan data stored in the storage unit 110, and is configured to include the input loading unit 122, the seat matching unit 124, the measurement unit 126, and the analysis unit 128.

The input loading unit 122 loads the seat design data and the seat scan data stored in the storage unit 110 to display the stored data, and includes certain information input windows and menus for seat matching.

The seat matching unit 124 loads the seat design data and the seat scan data stored in the storage unit 110, and performs the matching by comparing dimensions and shapes of the seat design data and the seat scan data with each other or making the dimensions and shapes of the seat design data and the seat scan data overlap each other.

For example, the seat matching unit 124 converts the seat design data and the seat scan data into 3D seat shapes, and automatically matches two converted 3D seat models with each other using coordinates of external points and hinge points of the seat design data and the seat scan data.

If a main section of the seat is selected in a matching state in which the two 3D seat models, that is, the 3D seat design data and seat scan data, overlap each other, the measurement unit 130 determines reference points (e.g., the highest point, the lowest point, and an inflection point) for a cutting plane of the selected section, and automatically measures the dimension values (e.g., bolster height and seat width) of the seat design data and the seat scan data on the cutting plane of the section at the same time.

The analysis unit 140 analyzes, through comparison, the dimension difference between the dimensions measured by the measurement unit, that is, the dimension difference between the seat design data and the seat scan data, and if the dimension difference is within an error range, the analysis unit 140 makes a pass decision for the dimension accuracy, whereas if the dimension difference deviates from the error range, the analysis unit 140 makes a fail decision for the dimension accuracy.

The output unit 150 automatically generates a specific result report file (e.g., PPT) including comparison analysis data and the pass/fail decision results.

Hereinafter, a method for automatically checking seat dimension accuracy, which is performed based on the above-described configuration, according to an exemplary embodiment of the present invention will be described.

Figure 2:
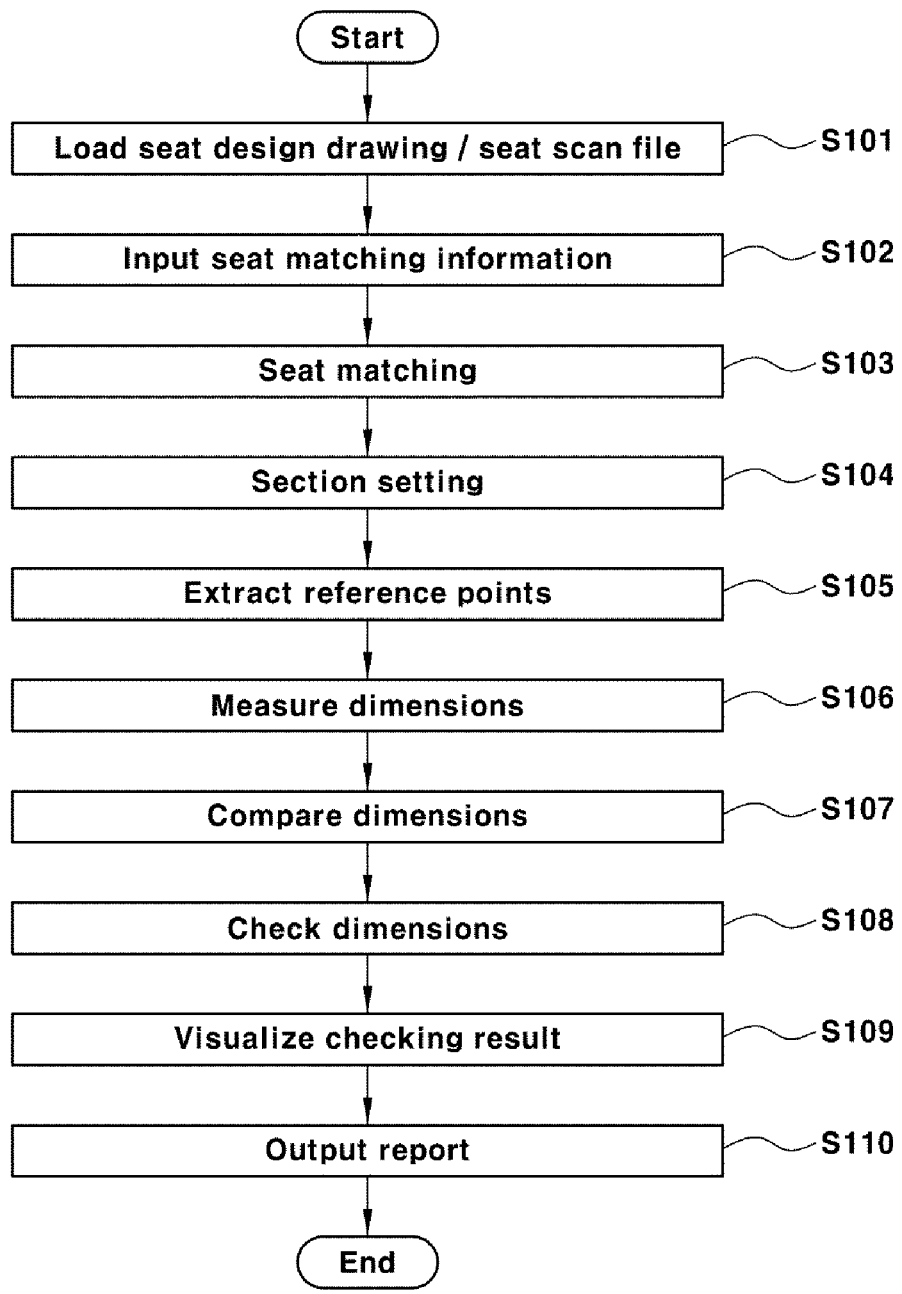
FIG. 2 is a flowchart illustrating a method for checking seat dimension accuracy for a vehicle according to an exemplary embodiment of the present invention.

FIG. 2 is a flowchart illustrating a method for checking seat dimension accuracy for a vehicle according to an exemplary embodiment of the present invention.

First, seat design data (e.g., a CAD file which is a seat design drawing file) at the time of designing is inputted from the external device 210 through the communication unit 140, and is stored in the storage unit 110. Furthermore, seat scan data (e.g., a seat scan file) obtained by scanning the actually produced seat using the 3D scanner 200 is inputted from the 3D scanner 200 through the communication unit 140, and is stored in the storage unit 110.

As such, a program for executing the method for automatically checking the seat dimension accuracy is executed after a computer including a recording medium for executing the method for automatically checking the seat dimension accuracy is booted, and then the seat design data (e.g., the seat design drawing (CAD file)) and the seat scan data (e.g., the seat scan file) stored in the storage unit 110 are loaded through the input loading unit 122 (S101).

As such, certain information for seat matching (e.g., angles among hip-point, torso, and thigh during seating) is selected and inputted using a menu input window of the input unit 122 (S102).

Next, if the seat design data (e.g., the seat design drawing (CAD file)) and the seat scan data (e.g., the seat scan file) are loaded and displayed on a display, seat matching using a specific algorithm is performed by the seat matching unit 120 to check whether the seat design data and the seat scan data coincide with each other (S103).

Figure 4:
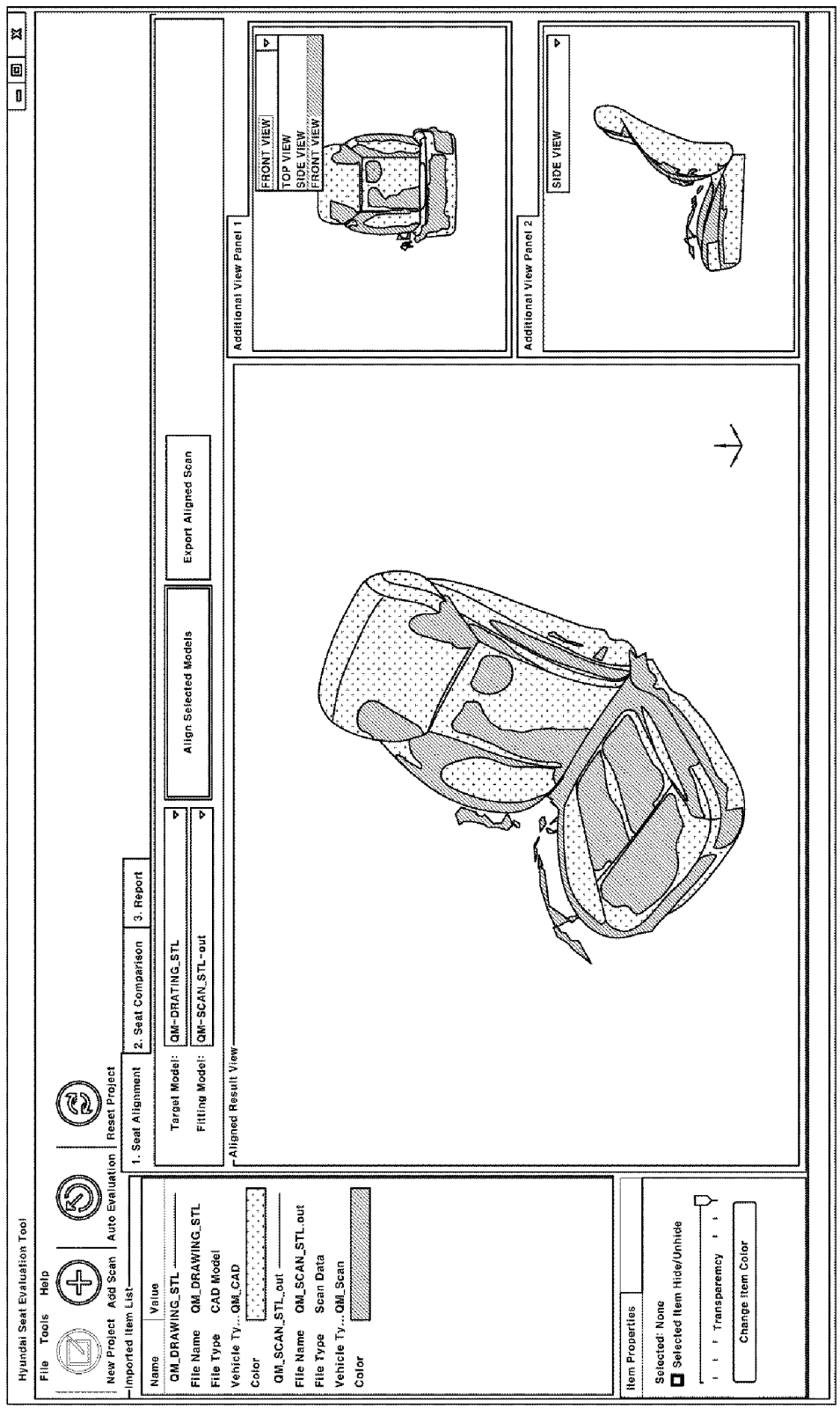
FIG. 4 is an image diagram showing an execution screen of an input unit and a matching unit in a system for checking seat dimension accuracy for a vehicle according to an exemplary embodiment of the present invention.

For reference, if a seat model in accordance with the seat design data (e.g., the seat design drawing (CAD file)) and a seat model in accordance with the seat scan data (e.g., the seat scan file) are loaded and then displayed on the display in an overlapping manner through the seat matching, as shown in FIG. 4, the seat model in accordance with the seat design data is displayed as a dotted portion, and the seat model in accordance with the seat scan data is displayed as a grey portion.

Here, the seat matching will be described in detail.

Figure 3:
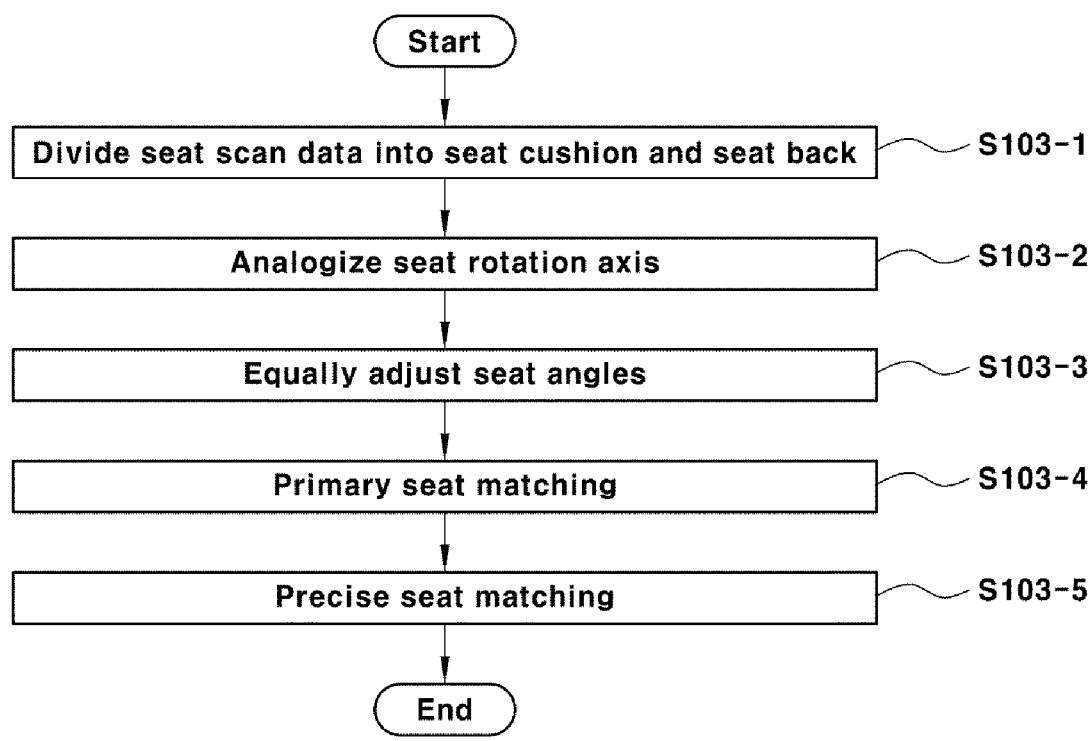
FIG. 3 is a flowchart illustrating a subdivided seat dimension accuracy process of a system for checking seat dimension accuracy for a vehicle according to an exemplary embodiment of the present invention.

Accompanying FIG. 3 is a flowchart illustrating subdivided processes of a seat matching step in a method for checking seat dimension accuracy for a vehicle according to an exemplary embodiment of the present invention, and FIGS. 7 to 14 are diagrams explaining respective subdivided processes of a seat matching step.

If a specific algorithm is executed by the seat matching unit 120, a 3D seat model in accordance with the seat scan data (e.g., seat scan file) is first divided into a seat cushion and a seat back (S103-1).

The reason why the 3D seat model in accordance with the seat scan data (e.g., seat scan file) may include the seat cushion and the seat back is to compare the dimensions of the seat cushion and the seat back with the dimensions of the seat cushion and the seat back of the seat design data, respectively.

Figure 7:
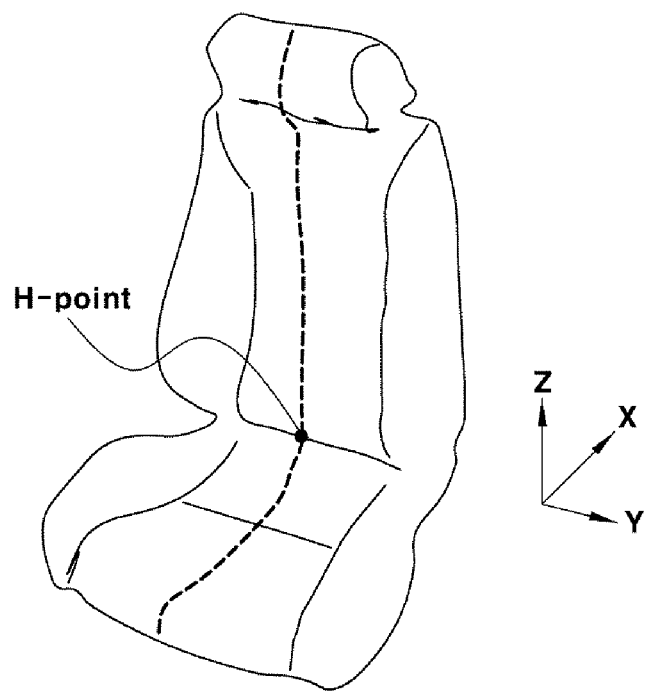
FIG. 7, FIG. 8, FIG. 9, FIG. 10, FIG. 11, FIG. 12, FIG. 13 and FIG. 14 are diagrams explaining respective subdivided processes of a seat matching step of FIG. 6.
Figure 8:
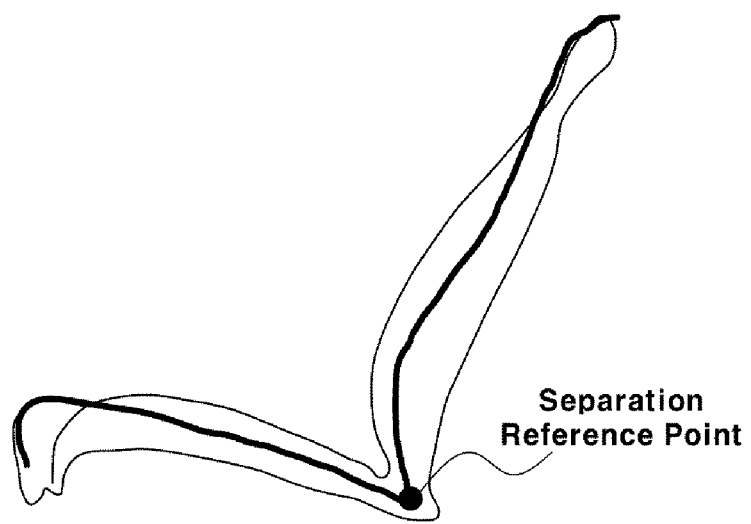
Figure 9:
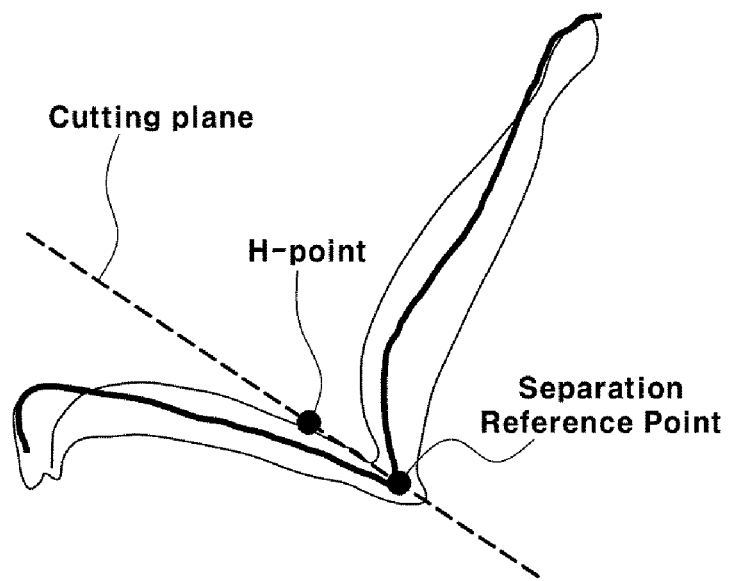
Figure 10:
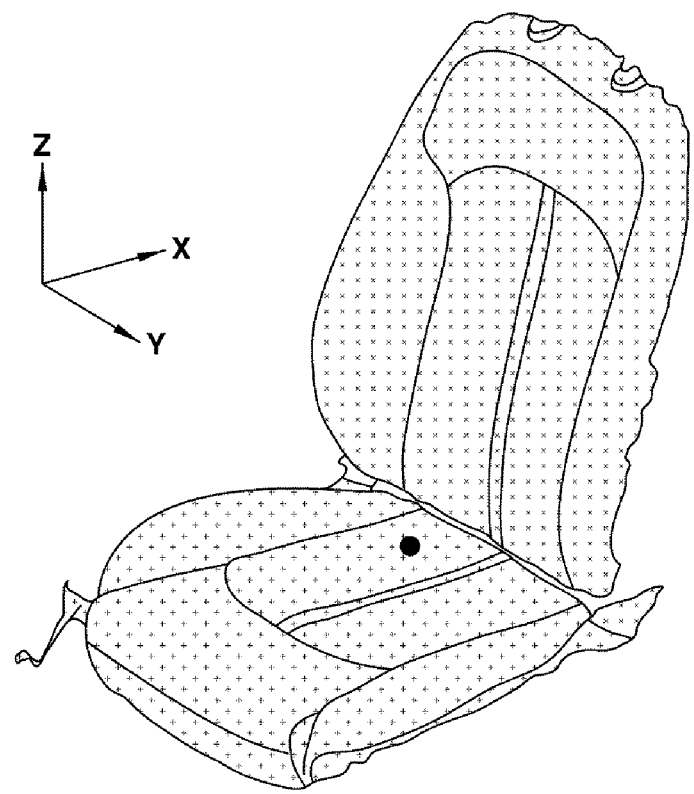

For this, dividing the 3D modeling seat in accordance with the seat scan data into the seat cushion and the seat back is performed in the order of:

Extracting a center profile (refer to a dotted line of FIG. 7) of the seat cushion and the seat back on the basis of a hip-point of the 3D seat model in accordance with the seat scan data (e.g., seat scan file) as shown in FIG. 7;

Creating a seat side portion curve (refer to a solid line of FIG. 8) by connecting points of the extracted center profile with one another through curve fitting of the respective points;

Determining a curvature of each fine section on the generated seat side portion curve;

Determining a point at which the curvature is changed most greatly as a separation reference point (refer to a separation reference point indicated in FIG. 9) at which the seat back and the seat cushion meet each other;

Defining a cutting plane by connecting the separation reference point with the hip-point inputted by a user; and Dividing the seat cushion and the seat back from each other on the basis of the cutting plane, and discriminating the seat cushion and the seat back from each other with different colors (refer to color discrimination example of FIG. 10) on the basis of a division boundary portion of the seat cushion and the seat back.

As such, if the 3D seat model in accordance with the seat scan data is divided into the seat cushion and the seat back, analogizing a rotation axis of the divided seat is performed (S103-2).

The reason why to analogize the rotation axis of the divided seat is to utilize the rotation axis in a process of adjusting an angle between the divided seat cushion and seat back.

Figure 11:
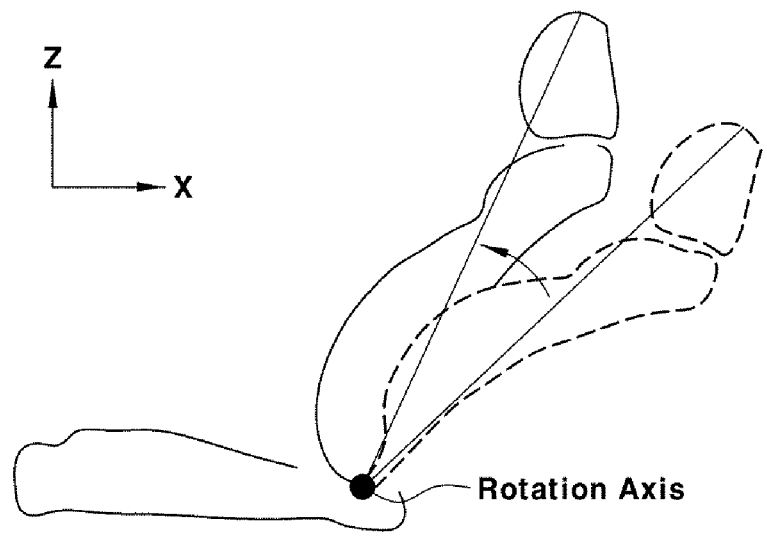

For this, analogizing the rotation axis of the divided seat is performed in the order of:

Determining a transformation matrix (=translation+rotation matrix) for respectively aligning the separated seat cushion and seat back using an iterative closest point (ICP) method which is a kind of 3D object matching algorithm;

Extracting only the rotation matrix of the seat back from the determined transformation matrix; and Determining an eigenvector from the rotation matrix of the extracted seat back, and defining an axis that passes through a position of the eigenvector and is in parallel to a side-direction axis (Y axis), and thus, as shown in FIG. 11, the rotation axis on which the seat back is rotatable against the seat cushion is determined.

Figure 12:
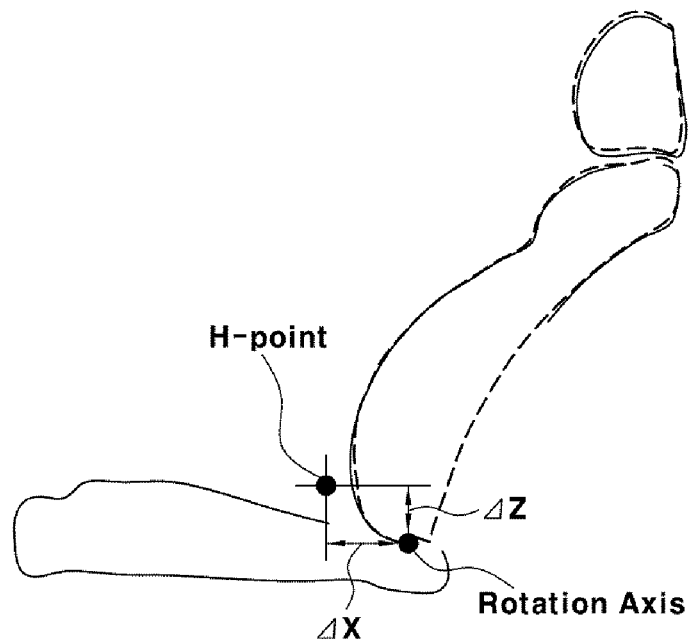

Accordingly, it is possible to transform the position of the rotation axis as determined above into relative coordinates ($\Delta X$, $\Delta Z$) on the basis of the hip-point as shown in FIG. 12, and thus the angle adjustment utilization with respect to the seat model in accordance with the seat scan data may be easily performed.

Next, to match the seat model in accordance with the seat scan data and the seat model in accordance with the seat design data with each other, equally adjusting seat angles is performed to make the angle between the seat back and the seat cushion of the seat model in accordance with the seat scan data and the angle between the seat back and the seat cushion of the seat model in accordance with the seat design data equal to each other (S103-3).

Figure 13:
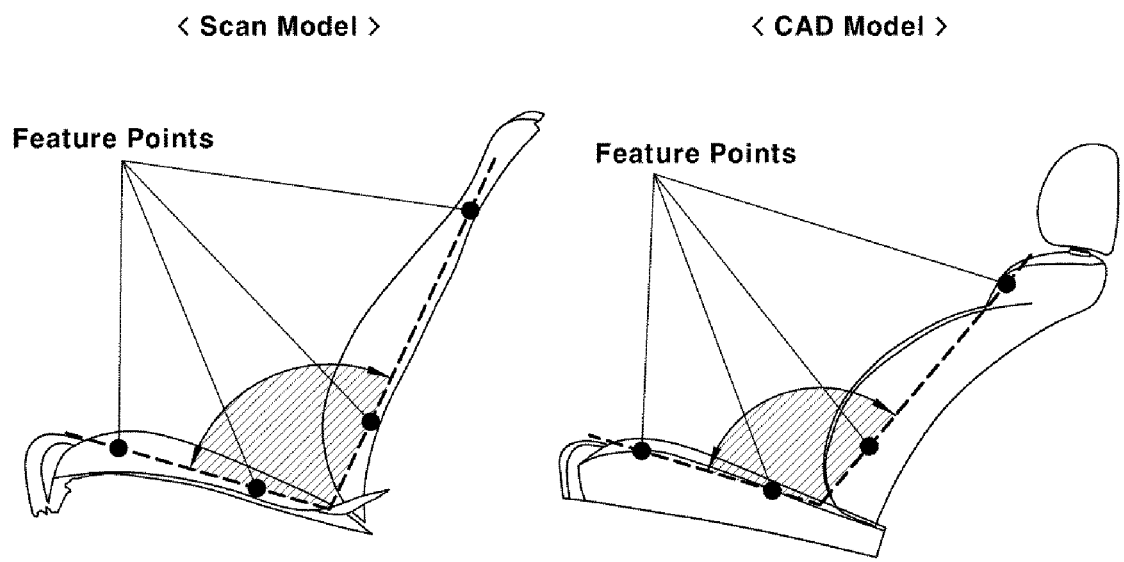
Figure 14:
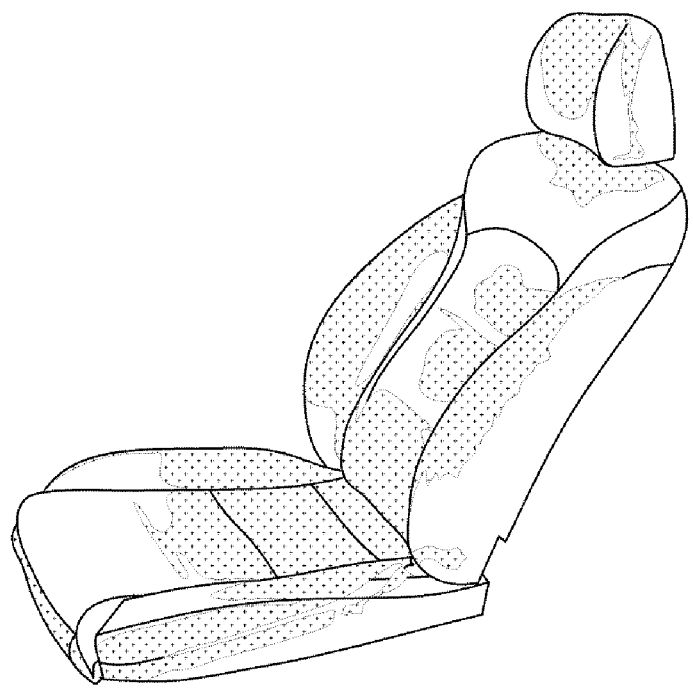

For this, equally adjusting the seat angles is performed in the order of:

Refer to FIG. 13, Extracting four or more feature points from the center profile of the seat model in accordance with the seat scan data and the seat model in accordance with the seat design data (e.g., extracting two feature points from the seat back and extracting two feature points from the seat cushion) and extracting a straight line connecting the feature points (refer to dotted line in the FIG. 12);

Determining, from the extracted straight line, the angle between the seat back and the seat cushion of the seat model in accordance with the seat scan data and the angle between the seat back and the seat cushion of the seat model in accordance with the seat design data;

If there occurs a difference between the angle between the seat back and the seat cushion of the seat model in accordance with the seat scan data and the angle between the seat back and the seat cushion of the seat model in accordance with the seat design data, adjusting the angle between the seat back and the seat cushion of the seat model in accordance with the seat scan data to match the angle between the seat back and the seat cushion of the seat model in accordance with the seat design data.

In the case of adjusting the angle between the seat back and the seat cushion of the seat model in accordance with the seat scan data, the seat back and the seat cushion are separated from each other as described above at operation S103-1 and the rotation axis is determined as described above at operation S103-2, and thus by rotating only the seat back of the seat model in accordance with the seat scan data about the rotation axis, the angle between the seat back and the seat cushion of the seat model in accordance with the seat scan data coincides with the angle between the seat back and the seat cushion of the seat model in accordance with the seat design data.

Next, primary seat matching is performed to primarily match the seat model in accordance with the seat scan data with the seat model in accordance with the seat design data (S103-4).

Although the seat back and the seat cushion of the seat model in accordance with the seat scan data are separated from each other as described above at operation S103-1 and the rotation axis is determined as described above at operation S103-2, the primary seat matching step is performed to match the non-separated seat model with the seat model in accordance with the seat design data as making the seat models overlap each other.

That is, the primary seat matching includes deriving the seat model in accordance with the seat scan data as a transformation matrix using the ICP algorithm and aligning the seat model in accordance with the seat scan data to overlap the seat model in accordance with the seat design data as it is.

After the primary seat matching, precise seat matching is performed to precisely match the seat model in accordance with the seat scan data with the seat model in accordance with the seat design data (S103-5).

After the primary seat matching is performed, the precise seat matching is performed to adjust the angle between the seat cushion and the seat back of the seat model in accordance with the seat scan data about the rotation axis determined at operation S103-2 to match the angle between the seat cushion and the seat back of the seat model in accordance with the seat design data, and thus the matching accuracy between the seat model in accordance with the seat scan data and the seat model in accordance with the seat design data may be heightened.

Preferably, by repeatedly performing operations S103-1 to S103-5 forming the seat matching step several times until the dimension difference between the seat model in accordance with the seat scan data and the seat model in accordance with the seat design data converges, the seat matching is completed.

Next, if the seat section of the target of checking is set in a state in which the seat model in accordance with the seat scan data and the seat model in accordance with the seat design data match each other (S104), reference points (a bolster projection point, the highest seat point, the lowest seat point, and a seat inflection point) included in the seat section are extracted (S105).

Figure 5:
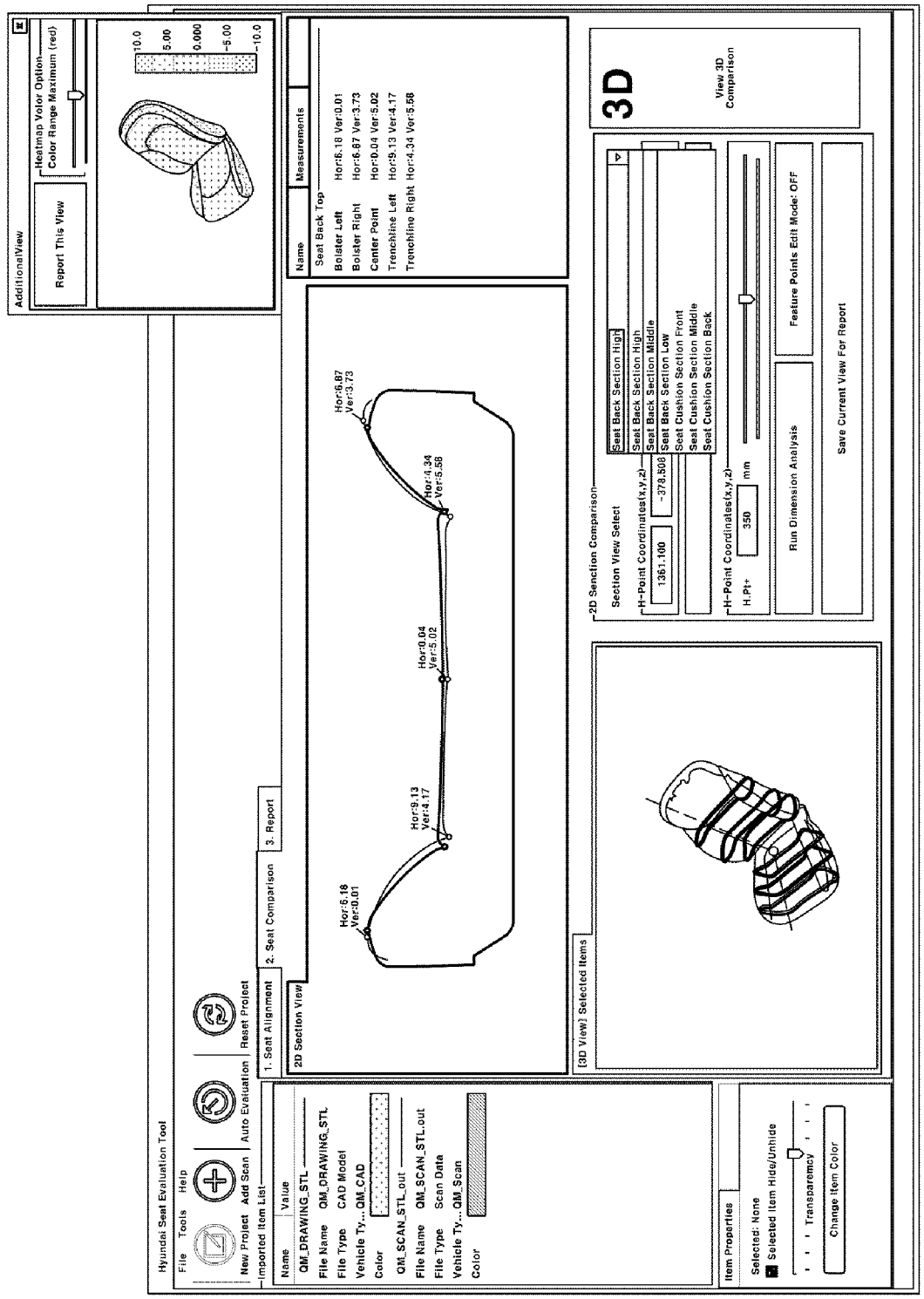
FIG. 5 is an image diagram showing an execution screen of a measurement unit and an analysis unit in a system for checking seat dimension accuracy for a vehicle according to an exemplary embodiment of the present invention.

As such, as shown in FIG. 5, the corresponding cross-sectional shape in accordance with the seat section setting is displayed on a display screen, and in FIG. 5, a thick line indicates the cross-sectional shape of the seat model in accordance with the seat design data, and a thin line indicates the cross-sectional shape of the seat model in accordance with the seat scan data.

In the instant case, the measurement unit 130 determines the reference points (e.g., the highest point, the lowest point, and the inflection point) for the cutting plane of the selected section based on the specific algorithm, and automatically measures the dimension values (e.g., bolster height and seat width) of the seat design data and the seat scan data on the cutting plane of the section at the same time (S106).

The analysis unit 140 analyzes, through comparison, the dimension difference between the seat design data and the seat scan data (e.g., bolster height difference and seat width difference) based on the specific algorithm (S107), and if the dimension difference is within the error range (e.g., about 5 mm or less) as the result of the comparison analysis, the analysis unit 140 makes the pass decision for the dimension accuracy, whereas if the dimension difference deviates from the error range (e.g., about 5 mm or more), the analysis unit 140 makes the fail decision for the seat dimension accuracy (S107 and S108).

In the instant case, the dimension checking result of the analysis unit 140 is visualized and displayed by a color map as shown as an image on the upper right side thereof (S109).

Finally, a report is automatically generated such that the final results of the dimension checking executed by the analysis unit 140 are automatically written on a specific report form (e.g., PPT file) as shown in FIG. 6 through the specific algorithm (S110).

According to an exemplary embodiment of the present invention as described above, it may be automatically verified whether the actually produced seat has been accurately produced to match the designed seat dimensions through automatic comparison of the seat design data with the scan data of the actually produced seat, and thus the accuracy of the seat dimension checking may be improved and the checking time may be greatly reduced in comparison with the conventional manual checking.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for automatically checking seat dimension accuracy for a vehicle, the system comprising:
   a memory unit configured to store therein seat design data at a time of designing an actually produced seat and seat scan data obtained by scanning the actually produced seat;
   a controller configured to determine when the actually produced seat has been produced to match predesigned dimensions using the seat design data and the seat scan data stored in the memory unit and to convert the seat design data and the seat scan data into a three-dimensional seat shape and to automatically measure reference points and dimension values while superimposed on each other to compare difference values therebetween; and
   a display unit configured to output a result of determination by the controller in a predetermined form;
   a scanner configured to scan the actually produced seat and to generate the seat scan data;
   an external device configured to provide the seat design data at a time of designing the actually produced seat; and
   a communication part configured to transmit the seat scan data generated by the scanner and the seat design data provided by the external device to the memory unit,
   wherein the controller includes:
      an input loading part configured to load the seat design data and the seat scan data stored in the storage unit to display the stored data, and including predetermined information input windows and menus for seat matching;
      a seat matching part configured to compare dimensions and shapes of the seat design data and the seat scan data with each other or to make the dimensions and shapes of the seat design data and the seat scan data overlap each other and dividing the seat model in accordance with the seat scan data into a seat cushion and a seat back, and analogizing a rotation axis of the divided seat after the seat model is divided into the seat cushion and the seat back in accordance with the seat scan data;
      a measurement part configured to determine the reference points for a cutting plane in a state in which the seat design data and the seat scan data overlap each other of a selected section, and automatically measure the dimension values of the seat design data and the seat scan data on a predetermined section cutting plane in a state in which the seat design data and the seat scan data overlap each other; and
      an analysis part configured to analyze, through comparison, a dimension difference between the seat design data and the seat scan data, and to make a pass decision for the seat dimension accuracy upon determining that the dimension difference is within an error range, and to make a fail decision for the seat dimension accuracy upon determining that the dimension difference deviates from the error range,
   wherein the analogizing includes:
      determining a transformation matrix for respectively aligning the seat cushion and the seat back separated from each other using an iterative closest point (ICP) method which is a kind of 3D object matching algorithm;
      extracting only a rotation matrix of the seat back from the determined transformation matrix; and
      determining an eigenvector from the rotation matrix of the extracted seat back, and defining an axis that passes through a position of the eigenvector and is in parallel to a side-direction axis (Y axis) as a rotation axis.

2. A method for automatically checking seat dimension accuracy for a vehicle, the method comprising:
   storing, in a memory unit, seat design data at a time of designing an actually produced seat and seat scan data obtained by scanning the actually produced seat via a scanner;
   determining, by a controller connected to the memory unit, when the actually produced seat has been produced to match predesigned dimensions using the seat design data and the seat scan data stored in the memory unit and converting the seat design data and the seat scan data into a three-dimensional seat shape and automatically measuring reference points and dimension values while superimposed on each other to compare difference values therebetween; and
   outputting, by a display unit connected to the controller, a result of determination by the controller in a predetermined form,
   wherein the determining is performed in an order of:
      loading, by an input loading part, the seat design data and the seat scan data stored in the memory unit;
      performing seat matching by making the seat design data and the seat scan data overlap each other in order for a seat matching part to check when the seat design data and the seat scan data coincide with each other;
      setting, by a measurement part, a seat section of a target of checking in a state in which a seat model in accordance with the seat scan data and a seat model in accordance with the seat design data match each other, and extracting reference points included in the seat section;
      determining, by the measurement part, the reference points for a section cutting plane, and measuring dimension values of the seat design data and the seat scan data on the section cutting plane at a same time; and performing, by an analysis part, dimension checking by analyzing, through comparison, a dimension difference between the seat design data and the seat scan data, and making a pass decision for the seat dimension accuracy upon determining that the dimension difference is within an error range and making a fail decision for the seat dimension accuracy upon determining that the dimension difference deviates from the error range as a result of the comparison, and wherein the storing includes:
transmitting the seat design data from an external device to the memory unit through a communication part connecting the storage unit and the external device and storing the seat design data in the memory unit, and transmitting the seat scan data obtained by scanning the actually produced seat through the scanner to the storage unit through the communication part and storing the seat scan data in the memory unit, and wherein the seat matching is performed in an order of:
dividing the seat model in accordance with the seat scan data into a seat cushion and a seat back; and
analogizing a rotation axis of the divided seat after the seat model is divided into the seat cushion and the seat back in accordance with the seat scan data;

wherein the analogizing includes:
determining a transformation matrix for respectively aligning the seat cushion and the seat back separated from each other using an iterative closest point (ICP) method which is a kind of 3D object matching algorithm;
extracting only a rotation matrix of the seat back from the determined transformation matrix; and
determining an eigenvector from the rotation matrix of the extracted seat back, and defining an axis that passes through a position of the eigenvector and is in parallel to a side-direction axis (Y axis) as a rotation axis.

3. The method of claim 2, wherein the seat matching is performed in an order of:
equally adjusting seat angles to form an angle between the seat back and the seat cushion of the seat model in accordance with the seat scan data and an angle between the seat back and the seat cushion of the seat model in accordance with the seat design data equal to each other;
performing first seat matching to match the seat model in accordance with the seat scan data with the seat model in accordance with the seat design data; and
performing second seat matching to match the seat model in accordance with the seat scan data with the seat model in accordance with the seat design data.

4. The method of claim 2, wherein the dividing includes:
extracting a center profile of the seat cushion and the seat back on a basis of a hip-point of the seat model in accordance with the seat scan data;
creating a seat side portion curve by connecting points of the extracted center profile with one another through curve fitting of respective points;
determining a curvature of each fine section on the generated seat side portion curve;
determining a point at which the curvature is changed most greatly as a separation reference point at which the seat back and the seat cushion meet each other;
defining a cutting plane by connecting the separation reference point and the hip-point with each other; and
dividing the seat cushion and the seat back from each other on a basis of the cutting plane.

5. The method of claim 3, wherein the equally adjusting includes:
extracting four or more feature points from a center profile of the seat model in accordance with the seat scan data and the seat model in accordance with the seat design data, and extracting a straight line connecting the four or more feature points;
determining, from the extracted straight line, an angle between the seat back and the seat cushion of the seat model in accordance with the seat scan data and an angle between the seat back and the seat cushion of the seat model in accordance with the seat design data; and
adjusting the angle between the seat back and the seat cushion of the seat model in accordance with the seat scan data to match the angle between the seat back and the seat cushion of the seat model in accordance with the seat design data upon determining that there is a difference between the angle between the seat back and the seat cushion of the seat model in accordance with the seat scan data and the angle between the seat back and the seat cushion of the seat model in accordance with the seat design data.

6. The method of claim 3, wherein the performing the first seat matching includes matching the seat model before being divided with the seat model in accordance with the seat design data as making the seat model before being divided and the seat model in accordance with the seat design data overlap each other.

7. The method of claim 3, wherein the performing the second seat matching includes adjusting the angle between the seat cushion and the seat back of the seat model in accordance with the seat scan data about a rotation axis determined during the analogizing to match the angle between the seat cushion and the seat back of the seat model in accordance with the seat design data.

8. The method of claim 2, wherein the outputting includes generating and outputting, by the display unit, final results obtained by executing seat dimension checking through an analysis part of the controller in a predetermined report form.

* * * * *